United States Patent [19]
Valli et al.

[11] 3,805,487
[45] Apr. 23, 1974

[54] SYSTEM FOR TRANSPORTING ELECTRICAL COMPONENTS
[75] Inventors: Henry M. Valli, Wappingers Falls; James D. Wharmby, Poughkeepsie, both of N.Y.
[73] Assignee: Cogar Corporation, Utica, N.Y.
[22] Filed: Feb. 26, 1971
[21] Appl. No.: 119,186

[52] U.S. Cl. .................................. 53/250, 220/1 R
[51] Int. Cl. ......................... B65b 1/06, B65d 1/00
[58] Field of Search ... 53/35, 3, 183, 159, 250–251; 206/1.5; 29/203 P, 203 J, 211 C; 221/289, 299, 303, 307, 53, 249, 299, 220–221 R

[56] References Cited
UNITED STATES PATENTS
2,372,072   3/1945   Flaws ............................... 53/183 X
3,023,555   3/1962   Schesch ............................ 53/251 X
2,846,830   8/1958   Bossi ................................ 53/35
3,662,881   5/1972   Fineran ........................... 53/35 X
1,684,747   9/1928   Stimpson ......................... 221/299

Primary Examiner—Roy Lake
Assistant Examiner—E. F. Desmond
Attorney, Agent, or Firm—Harry M. Weiss, Gottlieb, Rackman & Reisman

[57] ABSTRACT
A system for transporting electrical components comprises a number of component trays, each tray comprising a number of parallel tracks along which the components can slide and can be stored and gates at the ends of each track for selectively blocking such tracks, and apparatus for indexing the trays along a path. The apparatus periodically moves the trays to a predetermined position along the path, so that one track after another moves into alignment with a station, at which the gates are opened to enable loading or unloading of the tracks.

10 Claims, 12 Drawing Figures

SYSTEM FOR TRANSPORTING ELECTRICAL COMPONENTS

Numerous production systems have been proposed and put into use by manufacturers of electrical components, and especially by manufacturers concerned with the automated mass production of large quantities of such electrical components which are of identical shape. It becomes necessary in such production systems to transport the electrical components from one processing step to another in a simple and yet efficient manner. For this purpose, various proposals have been made for the provision of trays for temporarily containing such components in order to transport them from one work site to another, and various mechanisms have been used to unload such trays of their components and then reload them with such components after the manufacturing step has taken place. Such prior art trays and related apparatuses have been quite bulky in size, so that they themselves required a significant amount of footage which detracted from the remaining space for other manufacturing steps. In addition, the trays themselves as well as the apparatus for handling them, have been complex, expensive, cumbersome, and generally poorly suited for their intended use.

Accordingly, it is a primary object of the present invention to provide a system for transporting electrical components, which includes trays for temporarily storing such components, and apparatus for transporting such trays along a path so that the trays can be unloaded or loaded, as may be desired, in a quick and efficient manner at various machine or processing sites and locations in the line of an automated production facility.

It is still a further object of the present invention to provide a tray for electrical components and especially for a large quantity of identical components, in which the components may be temporarily stored and which will accommodate the sliding of components to enable loading or unloading thereof, and which further includes readily operable gates for selectively blocking such loading or unloading.

It is still another object of the present invention to provide an apparatus for transporting such trays for components along a path and more specifically for indexing such trays along said path to bring one track after another of the trays into alignment with a station for loading or unloading purposes, and which will open the aforesaid gates for entrance of components as well as exit of such components, as desired.

In general, and in accordance with the teaching of the present invention, the system for transporting electrical components includes a number of trays for temporarily storing electrical components. Each tray includes a set of generally parallel linearly elongated tracks in which the components can be stored and along which the components can slide in file formation, either for the purpose of filling a track or for the purpose of emptying a track. Each track on a tray includes a pair of gates disposed at opposite ends thereof, each such track being movable between a position blocking the track and a position not interfering with such track. Thereby such gates when desired can either retain components in the tracks or permit entry of the components into the tracks or exit of such components from the tracks.

The mentioned trays are intended for use with apparatus for transporting them along a predetermined path. The apparatus periodically indexes the trays along such path to align the tracks thereof, one after another, with a station along the path which may comprise an exit port or an entrance port. The apparatus includes a walking beam assembly which periodically engages the tracks, moves them to a limited extent in a direction parallel to the path, and then withdraws from the trays. A locator associated with the path precisely positions each track of a tray in turn with respect to an exit port or an entrance port, for unloading or loading purposes, respectively. The locator in addition opens the appropriate gate of the track in alignment with the station to enable the movement of components out of or into the track, as required. A sensing mechanism determines when the loading or unloading operation has been completed, and then signals the walking beam to bring the next track into place.

The present system enables the use of identical trays for loading, storing and unloading similarly — configured electrical components at various steps of automated production of such components. Since the same apparatus may be utilized with only minor changes for unloading and loading purposes, there are obvious economies which may be attained with the present system.

Further objects, features and advantages of the invention will become apparent upon consideration of the following more detailed description in conjunction with the accompanying drawings, wherein.

Figure 1:
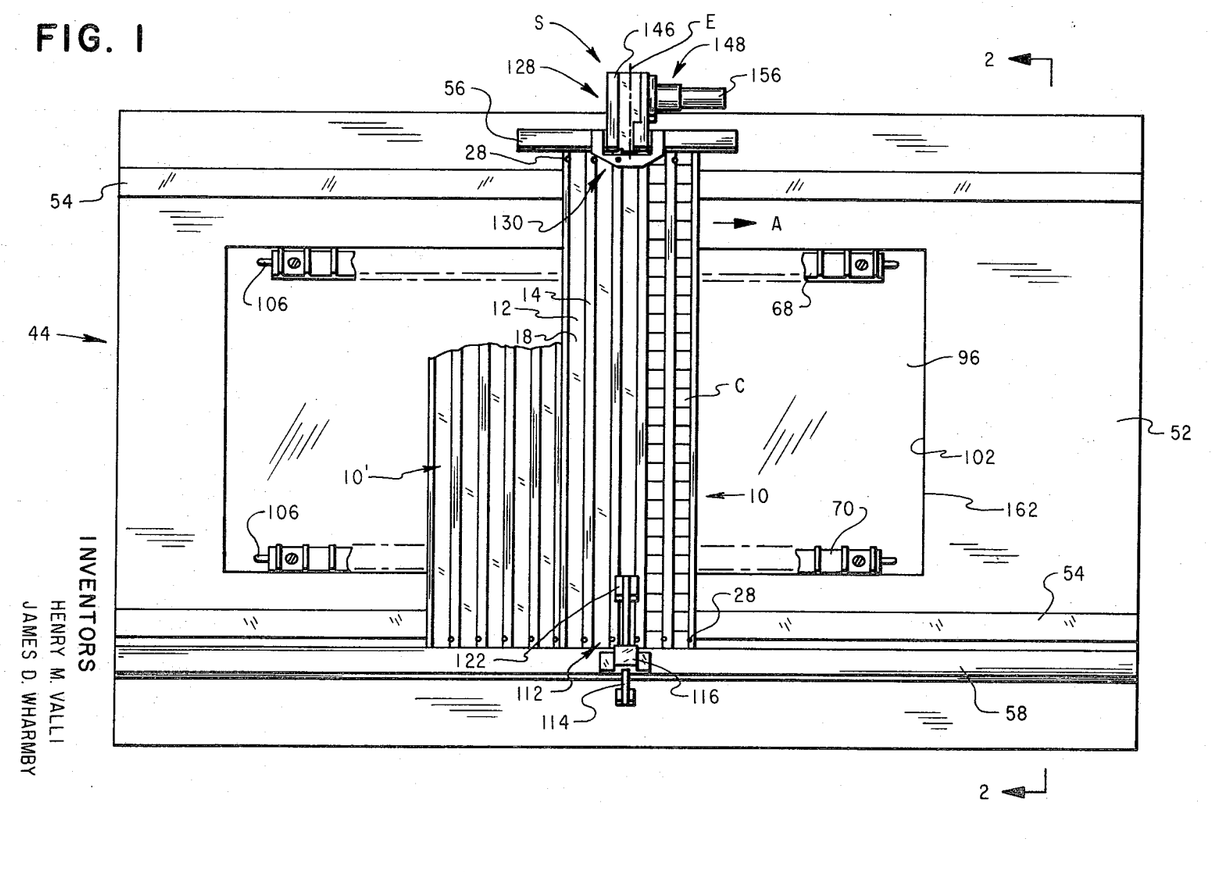
FIG. 1 is a front elevational view of the tray handling apparatus with two trays thereon, in accordance with the teaching of the present invention.

Referring now in detail to the drawings, and initially to FIGS. 1 through 3 and 6, the system for transporting electrical components is adapted to operate upon at least one and desirably a large quantity of trays 10 which are adapted to temporarily store, load or unload a number of electrical components. The components are generally of a large number and identical in external configuration. In the present embodiment, the electrical articles are electronic circuit modules or the substrate bases of such modules, either before contact pins have been fixed to such bases or after such pins have been fixed. However, it is apparent that electrical components of a great variety of shapes and sizes can be accommodated by the present system. The trays 10 are generally of identical construction and, as best seen in FIG. 1 wherein two trays 10, 10' are shown in abutting relation, are of rectangular configuration in plan. Each tray (see FIG. 6) has formed therein a number of linearly-elongated parallel tracks 12, the cross sections of the tracks being identical and each track being separated from the others by elongated ridges 14. The undersides of the trays 10 have a number of uniformly spaced ribs 16 formed thereon, the ribs being generally parallel to the ridges 14. These ribs 16, when the trays 10 are operated upon by the present tray handling apparatus, comprise a rack, which enables the trays to be shifted along a path, as will be described in greater detail subsequently. Each of the tracks 12 on each tray 10 includes a bottom wall 18, a pair of opposed side walls 20, 22 and an open top 24. Each of the side walls 22, 24 of each track 12 has a groove 26 formed along its length, the grooves 26 being parallel and disposed laterally from one another, and being of such dimension that they can receive and slidably support the opposite sides of an electrical component C therein. Usually such electrical components C are square in plan, as would be a substrate base, and fill a track 12 in abutting file orientation. FIG. 1 shows some of the tracks 12 of the tray 10 filled with such components C and other tracks 12 empty. The trays can be stacked one on another, see FIG. 6A, without contact with the components C therein.

Figure 4:
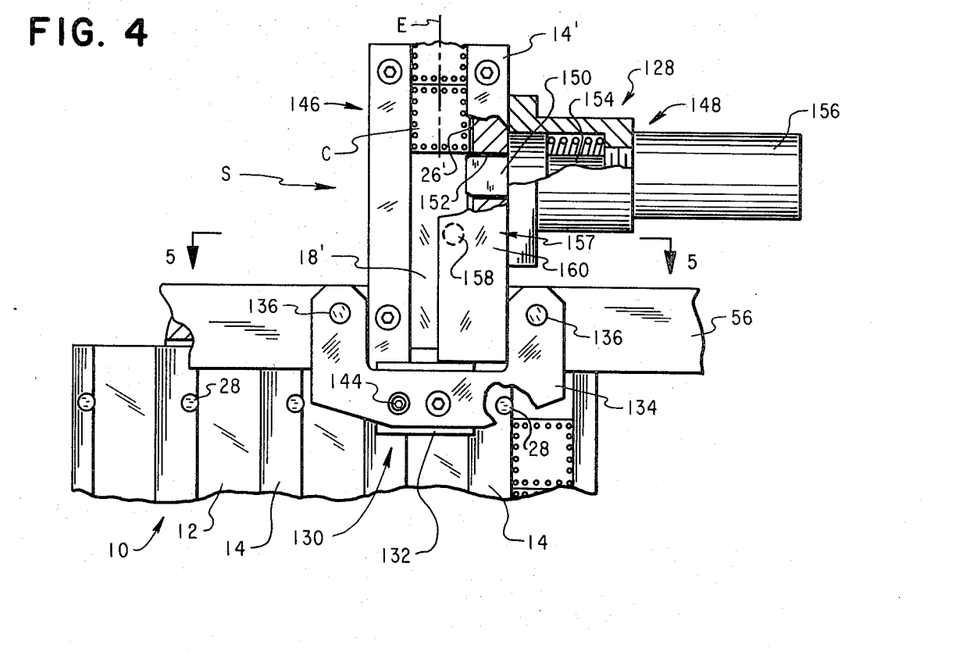
FIG. 4 is a fragmentary front elevational view of the upper locator assembly, another component of the tray handling apparatus.

Each of the tracks 12 of each tray 10 has a gate 28 situated at least at one end thereof, and desirably has gates at both ends thereof. The gates 28 prevent components C within the tracks 12 of the trays from sliding out of the tracks accidentally. As seen in FIGS. 1 and 4, the gates 28 are located closely adjacent the ends of the tray 10 and are situated within the ridges 14 of the tray. The gates are located in opposed locations with respect to the tracks at different ends of the tray, so that no matter which end of the tray 10 is "up," (i.e., uppermost on the apparatus), the gates 28 will be correctly and similarly oriented for cooperation with the apparatus.

Figure 5:
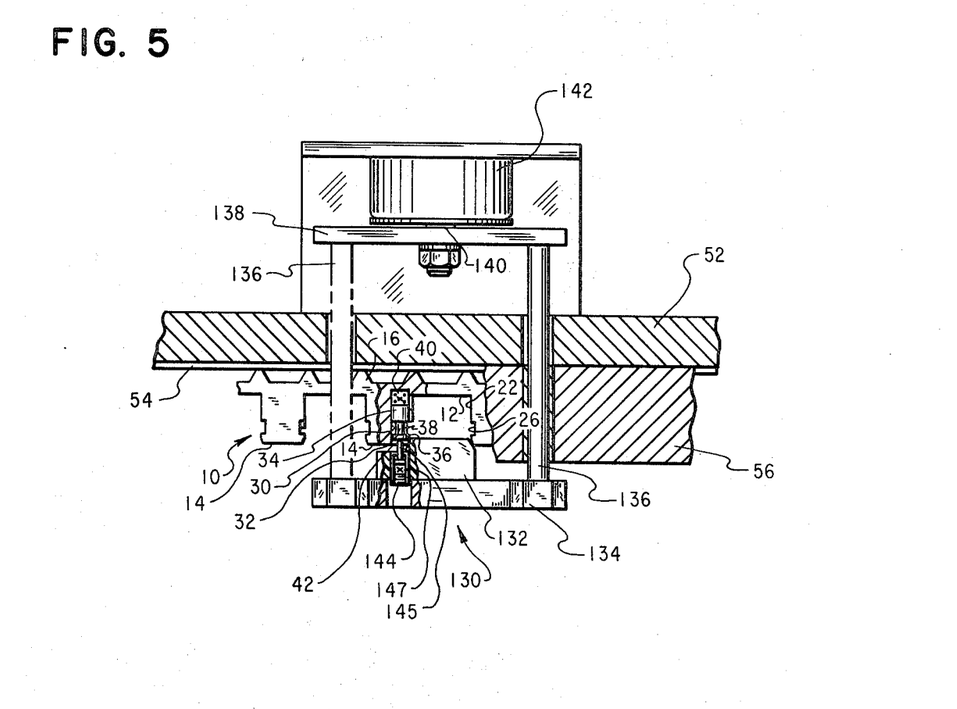
FIG. 5 is a cross-sectional view of the upper locator assembly, taken substantially along the line 5—5 of FIG. 4.
Figure 10:
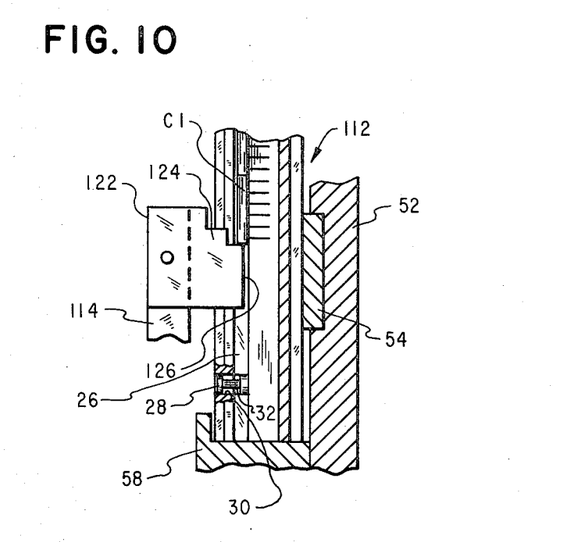
FIG. 10 is a cross-sectional view of the lower locator assembly, taken substantially along the line 10—10 of FIG. 9.

A typical gate 28 is shown in detail in FIGS. 5 and 10. Each gate 28 includes a bore 30 formed in a ridge 14, the bore in its mid-section opening into and communicating with the groove 26 in one of the side walls 20, 22 of a track 12. The bores 30 pass through the ridges in which they are located, but terminate short of the underside of the tray. Since the bore 30 opens into one of the grooves 26, the gates 28 are situated off-center with respect to the centerlines of the ridges, see FIG. 1. A plunger 32 is situated in each bore 30, and is of cylindrical configuration. More specifically, each plunger includes a pair of ends, an exterior end 36 and an interior end 34, of enlarged circular cross-section, and a mid-section 38 of reduced cross-section. A coil spring 40 situated at the interior end of the bore 30, abuts the interior end 34 of the plunger, and biases the plunger outwardly with respect to the bore. The entrance 42 to the bore 30 is peened over, i.e., restricted to thereby capture the plunger within the bore.

The plunger 32 is shiftable axially within the bore 30 between a track blocking position and a position permitting entry into or exit from the track. In the track blocking position, (see FIG. 10) at which the exterior end 36 of the plunger is in contact with the restricted bore entrance 42, the shoulder of the interior end 34 is in alignment with and thus blocks, at least in part, a groove 26 of its track, thereby preventing the components C from passing the gate and leaving a track 12 at this end. However, when the plunger 32 is depressed, as seen in FIG. 5, the mid-section 38 of the plunger 32 shifts into alignment with the groove 26, so that a component C can pass along the groove, by the plunger and out the end of the track 12. Desirably, the axial length of the mid-section 38 is the same as the width of the groove 26, and the shoulder of the interior end 34 of the plunger 32 comes into alignment with the interior edge of the groove 26, when the plunger 32 is completely depressed into the bore 30. The gates normally assume a track-blocking position, by the action of the spring 40 on the plunger end 34.

Figure 6:
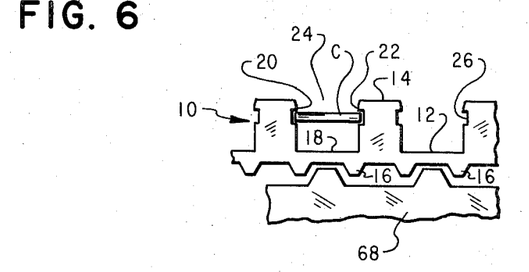
FIG. 6 is a cross-sectional view of a first embodiment of a tray for electrical components upon which the present apparatus operates, shown engaged by the teeth of a rack of the tray handling apparatus.
Figure 7:
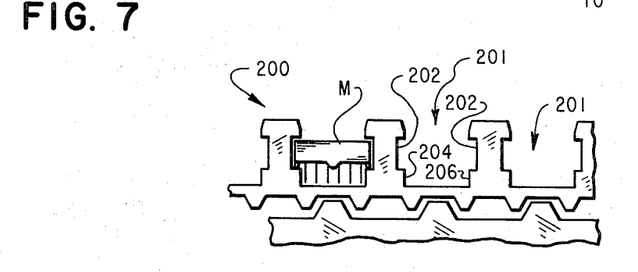
FIG. 7 is a cross-sectional view of another embodiment of a tray for electrical components upon which the present apparatus operates, also shown engaged by the teeth of the rack of the tray handling apparatus.

FIG. 7 shows another embodiment 200 of the tray having a number of tracks 201 each with a groove 202 in each of its side walls 204, 206. The grooves 202 are of considerably greater depth than the groove 26 in the tray 10 illustrated in FIG. 6. The track configuration of the tray 200 is especially adapted to hold components of greater depth, as for example, integrated circuit modules M.

Figures 2, 3:
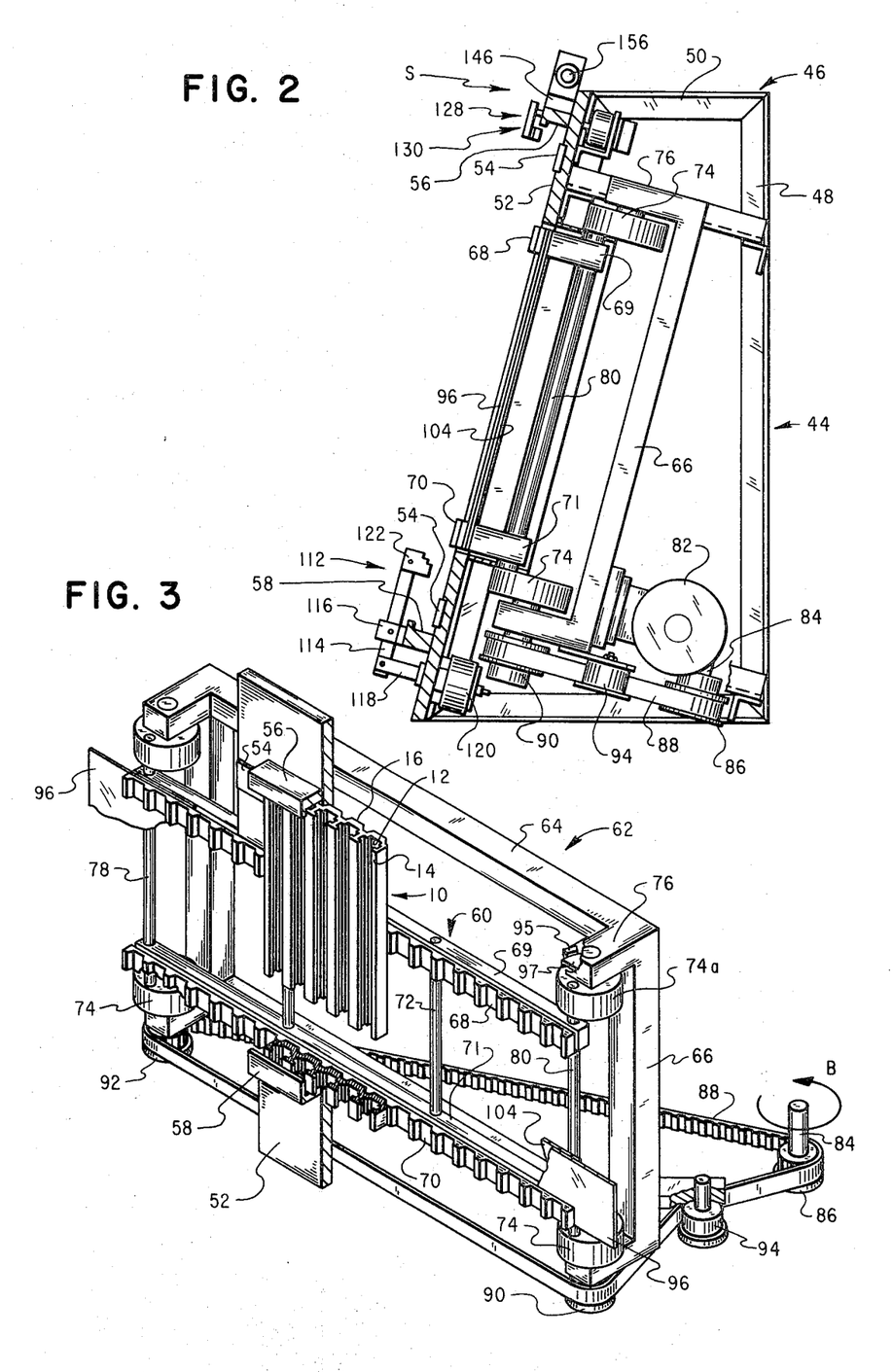
FIG. 2 is a cross-sectional view of the tray handling apparatus, taken substantially along the line 2—2 of FIG. 1.
FIG. 3 is a perspective view of the walking beam drive assembly, which is a component of the tray handling apparatus.

The apparatus 44 for handling trays is best shown from an overall view in FIGS. 1, 2 and 3. The apparatus includes a frame 46 including a number of vertical frame members 48 and a number of horizontal frame members 50, interconnected to form a rigid structure. A front plate 52 is attached to the frame 46, and is oriented by the frame members 48, 50 at an inclined angle.

One or more trays 10, 10' are transported by the apparatus along an operative path across the frame plate 52 in a direction longitudinally of said plate in a direction indicated by the arrow A in FIG. 1. In this movement, the trays 10 are situated with their ribs 16 on their underface sliding along the front plate 52, and specifically along a pair of parallel spaced elongated slide bars 54. The slide bars are set into but protrude from the plate 52 so that the ribs 16 will slide along them, and not contact the front plate 52. Desirably, the slide bars 54 are formed of a material having low sliding friction.

The trays 10 are guided in their movement across the face plate 52 of the apparatus 44 along their operative path by upper and lower rails, respectively 56, 58. Each rail includes a first leg projecting generally perpendicularly from the front plate 52, and a second leg at a right angle to the first leg, the upper rail 56 having its second leg projecting downwardly, and the lower rail 58 having its second leg projecting upwardly. The rails are open at their ends and enable the trays to slide along the inclined front plate 52 in proper orientation along the operative path and prevent the trays from accidentally falling away from the front plate. The upper rail 56 is considerably shorter than the lower rail 58 is situated for the purpose of guiding the trays at a station on the path, to be described.

Figure 6A:
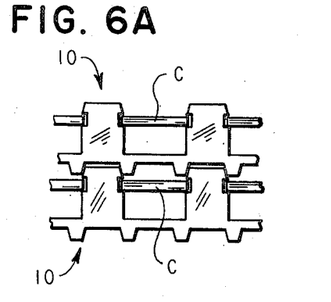
FIG. 6A shows the first embodiment of the tray with one tray being stacked on another.

The tray handling apparatus 44 further includes a walking beam drive assembly 60. The assembly includes a drive frame 62 which supports the other components of the assembly, and which includes a pair of horizontal struts 64 and a pair of vertical struts 66. The assembly further includes a pair of elongated parallel gear racks, namely an upper rack 68 and a lower rack 70 which are supported by rack bars 69, 71 respectively. The teeth of the gear racks 68, 70 face outwardly and are configured to matably engage the ribs 16 on the underside of the trays 10. More specifically, the teeth on the racks 68, 70 are spaced apart uniformly and to such an extent that they can engage every other groove formed between the ribs 16 of the tray 10, as seen in FIGS. 3 and 6. The racks extend to a length that they can engage several trays simultaneously and thus have a length greater than the width of at least two trays. One or more spacers 72 separate and rigidly interconnect the racks 68, 70.

The racks 68, 70 are mounted for joint walking beam movement by an eccentric assembly supported by the drive frame 62. The eccentric assembly includes four eccentric wheels 74, which are mounted for parallel rotation on four arms 76, each arm projecting from a different corner of the drive frame 62. The eccentric drive assembly further includes a pair of drive shafts 78, 80, the shaft 78 interconnecting and being journaled on one pair of eccentric wheels 74, and the shaft 80 interconnecting and being journaled on another pair of eccentric wheels 74. Each of the rack bars is mounted at both of its ends on the shafts 78, 80. When the eccentric wheels 74 are rotated, the rack bars and thus the racks 60, 70 will follow a generally circular path. The eccentric wheels 74 are located on the drive frame 62 so that as they move the racks 60, 70 toward the front of the drive frame, the racks will engage the ribs 16 of any trays held by the guide rails 56, 58 and shift the trays in the direction of the arrow A in FIG. 1 along the operative path and then withdraw from the trays. The front plate 52 has an enlarged rectangular opening 162 from therein to enable the racks 68, 70 to move forwardly into contact with the undersurfaces of the trays and then to withdraw therefrom. The eccentric wheels 74 and the shafts 78, 80 are also so situated that upon each rotation thereof, the racks will advance the trays along the path a distance equal to the width of a single track of a tray.

A drive mechanism is provided to rotate the eccentric wheels 74 and includes a motor 82 fixed to the drive frame 62, having a downwardly extending drive shaft 84 which terminates in a pinion 86. The pinion 86 engages a timing belt 88 which trails about a pair of pulleys 90, 92, each of these pulleys being fixed on a shaft mounting one of the lower eccentric wheels 74. An idler 94 keeps desired tension on the belt 88. When the motor 82 is energized, the drive shaft 84 rotates, driving the belt 88 in the direction B as seen in FIG. 3, which in turn drives the eccentric wheels 74, to give the gear racks 68, 70 the walking beam movement as previously described. The eccentric wheels 74 rotate through one revolution at a time. To this end, one of the eccentric wheels 74a, FIG. 3, has a flat 97 thereon which operates on a microswitch 95 to open the same upon one revolution.

Figure 8:
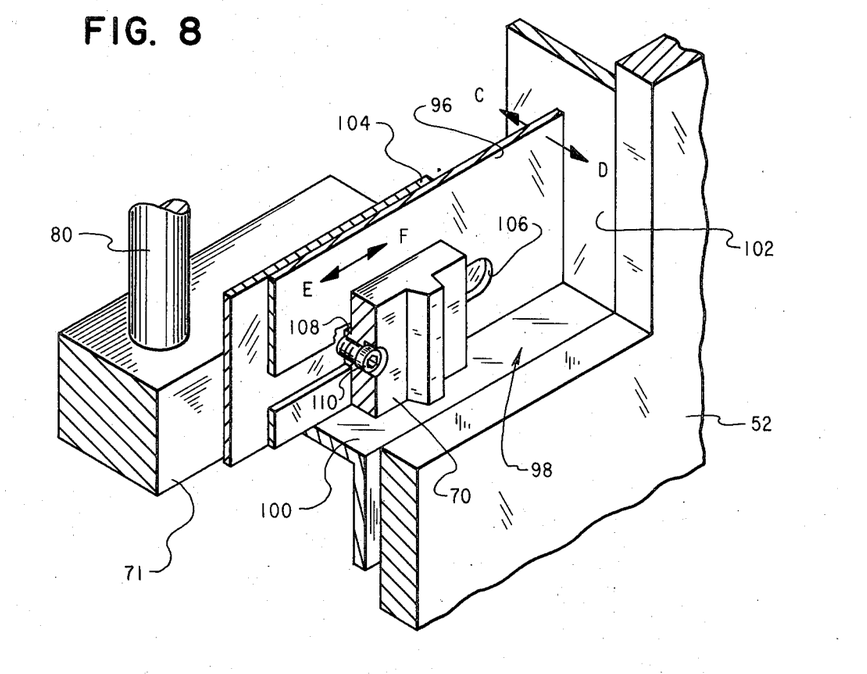
FIG. 8 is a partially broken away perspective view showing the safety cover assembly of the tray handling apparatus.
Figure 9:
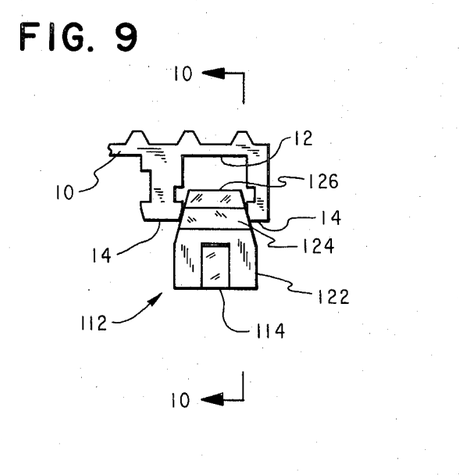
FIG. 9 is a fragmentary top plan view of the lower locator assembly, another component of the tray handling apparatus.

A safety cover assembly prevents the hands of workers from being inserted into the assembly and also prevents electric components or other miscellaneous parts from dropping therein. The cover assembly (FIG. 8) includes a cover plate 96, which is received within and reciprocates with respect to an interior frame 98, said frame including horizontal interior frame members 100 and vertical interior frame members 102. The interior frame 98 is generally of rectangular configuration so that the cover plate 96 may move forwardly and rearwardly in the directions C, D as indicated in FIG. 8, without interference, such movement being generally perpendicular to the plane of the operative path. The cover plate 96 abuts a backing plate 104, the plate 104 being fixed to the rack bars 69, 71. The cover plate 96 is captured between the backing plate 104 and the racks 68, 70 for sliding movement. For this purpose, the cover plate 96 has a pair of parallel elongated slots 106 formed therein, generally parallel to the length of the racks 68, 70, with the ends of the slots extending slightly beyond the ends of the racks 68, 70 when the racks are centered as seen in FIG. 1. A rearwardly protruding flange 108 is carried by each rack 68, 70, the flanges 108 protruding into the slots 106 and abutting the backing plate 104. The racks 68, 70 are held to their respective bars 69, 71 by screws 110 which pass through the racks, through the flanges 108 thereon and then through the backing plate 104 into the bars 69, 71. In this manner, as the racks 68, 70 follow their circular path, the cover plate 96 reciprocates forwardly and rearwardly in the interior frame 98, and while so doing, also reciprocates sliding over the backing plate 104, in the direction E-F, as shown in FIG. 8.

The apparatus may be utilized to load a tray one track after another, with components and, with minor changes, may be used to unload components from the tracks of the trays. The apparatus structure described to this point is common to both a loading form and an unloading form. Further description will now be devoted to the loading form, and a subsequent description will point out the differences required to achieve an unloading apparatus format.

As the apparatus indexes one or more trays along the path, it brings one track after another in turn into inclined vertical alignment with a component port and, specifically in the loading format of the apparatus, with a component loading station S. Components are fed into station S by another mechanism, after such components have completed a processing step.

In order to properly locate the tracks 12 of the trays 10 on the apparatus 44 and in alignment with station S, a lower locator 112 is fixed on the frame 46 and is shown in FIGS. 1, 2, 9 and 10. The locator 112 includes a lever 114 pivoted at a mid-section thereof on an arm 116 extending from a lower portion of the front plate 52 and specifically from the lower rail 58. The lower end of the lever 114 is connected to a solenoid plunger 118 extending from solenoid 120 whereby the lever 114 can be rocked. The upper end of the lever 114 carries a locator head 122. The lever arm is arranged so that when the solenoid 120 is energized, the plunger 118 projects outwardly, rocking the lever and moving the head 122 toward the front plate 52. When the solenoid 120 is de-energized, a spring return retracts the plunger 118, causing the head 122 to pivot away from the front plate 52.

The locator head 122 has its portion closest to the plate 52 in the form of a protruding double-chamfer tongue 124 so that as the head 122 moves toward the plate 52, the tongue 124 will engage the tray 10, and more specifically will move into the space between any two adjacent ridges 14 of a track 12. Due to the aforesaid configuration of the tongue 124, the head will slightly shift the tray, if required, so that the track 12 is centered directly on the head 122. The head 122 is in alignment vertically with the centerline E of the station S, see FIG. 1, whereby components C entering the station S can slide into a waiting track 14.

The tongue 124 of the head 122 of the locator 112 has a lip 126 extending from it, the lip being dimensioned so as to protrude deeply into the track 12 as far as the grooves 26, so as to prevent any components C from sliding beyond this point further down the track which is in alignment with station S. FIG. 10 illustrates the head 122 of the locator 122 abutting a tray 12, with the lip 126 thereof protruding into the track 12 to a point parallel with the grooves 26 so as to prevent the component $C_1$ from moving further down the track. It should be noted that the lip 126 stops the component $C_1$, at a point above the gate 28.

The tray handling apparatus 44 further includes a locator-gate assembly 128, shown in FIGS. 1, 2, and in greater detail in FIGS. 4 and 5, situated at station S. The assembly 128 includes a track segment 146, having the same internal configuration as a track 12. The track segment 146 is fixed at an incline on the frame plate 52 and specifically on upper rail 56 and is centered on line E. Hence, components C may slide downwardly along the track segment 146 and then directly into a track 12 centered by the lower locator 112 on centerline E.

The assembly 128 also includes an upper locator 130 having a head 132 carried by a support 134 of "U" configuration. The head 132 is of the same configuration as the locator head 122 of the lower locator 112, except that it does not have a protruding lip. The head support 134 is carried by a pair of elongated shafts 136 which are mounted for axial movement in bearings in the upper rail 56 and through plate 52. The shafts 136 are connected at their rear ends by a cross bar 138 which is connected to the plunger 140 of a solenoid 142. When the solenoid 142 is energized, the plunger 140 is retracted, pulling the shafts 136, and thus the support 134 and the head 132 toward the face plate 52 and into engagement with a tray, and specifically between any adjacent pair of ridges 14 of a track 12, thereby centering a track 12 on such head and on the centerline E. When the solenoid 142 is de-energized, a spring return moves the plunger out of the solenoid and thereby moves the head 132 away from any track 12.

The support 134 carries a spring plunger 144, conventional in the industry, which includes a protruding pin 145 biased outwardly by a spring 147. When the locator 130 is retracted toward the tray, the plunger 144 opens the gate 28 associated with the track 12 centered on the head 132 and on centerline E to permit components to enter and fill such track.

The locator-gate assembly 128 further includes a component stop mechanism 148 which is associated with the track segment 146. The stop mechanism 148 (see FIG. 4) includes a tongue 150, which reciprocates in and out of a groove 26' in the track segment 146. The tongue 150 reciprocates in a slot 152 extending laterally of the segment 146 and terminating in the groove 26'. The tongue 150 is connected to and driven by a plunger 154 extending from a solenoid 156. When the solenoid 156 is energized, the plunger 154 is withdrawn, drawing the tongue 150 out of the groove 26' in the track segment 146, thereby permitting any number of components C to slide down said track segment. When the solenoid 156 is de-energized, the plunger 154 is spring driven toward the track segment 146, whereupon the tongue 150 is inserted into the groove 26' so as to block further component movement.

Sensing means detects when one or more components C are situated in the track segment 146. To this end, a photoelectric sensing assembly 157 includes a beam 158, situated in the floor 18' of the track segment 146 and a photocell 160 carried by one of the ridges 14' of the track segment. When a component C is situated for a period of time in the track segment between the beam 158 and the cell 160, the photoelectric assembly will detect its presence.

Figure 11:
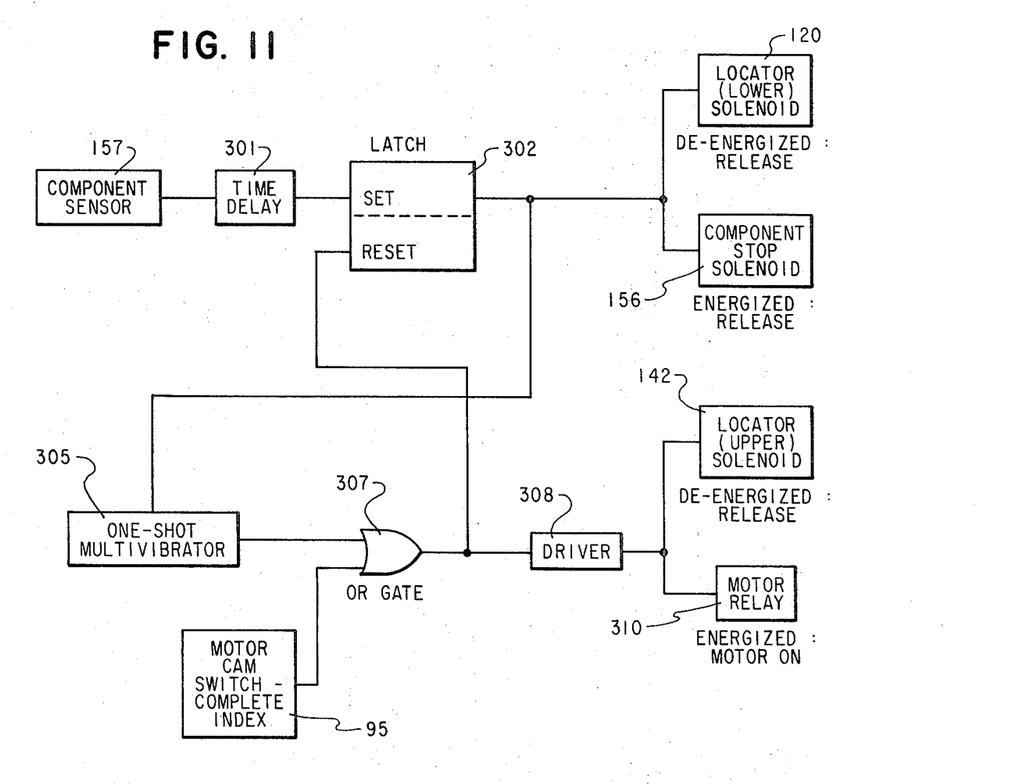
FIG. 11 is a schematic circuit diagram for the tray handling apparatus.

FIG. 11 is a schematic circuit diagram for controlling the apparatus 44. Component sensor 157 detects the passing of a component C past photocell 158 (see FIG. 4). Each time a component passes the photocell, a short pulse is generated. The pulse is extended through time delay element 301 to the set input of latch 302. The time delay element 301 functions as an integrator; the short pulses at the output of component sensor 157, as components continue to slide past cell 158, are incapable of setting latch 302. However, as soon as the cell is blocked by a component which is situated at the cell for approximately 1 second, the output of time delay element 301 is sufficient in magnitude to set latch 302.

The output of latch 302 is extended to lower locator solenoid 120 and to component stop solenoid 156. The former, when energized, causes lower locator 112 to bear against a track of the tray as described above. When the latch is set, however, the lower locator solenoid 120 is de-energized and it releases. This clears locator 112 so that the tray can be moved. At the same time, the latch 302 being set causes component stop solenoid 156 to de-energize. As long as the solenoid is energized, stop mechanism tongue 150 is withdrawn so that components can slide along track segment 146. However, as soon as the solenoid becomes de-energized, it operates to extend tongue 150 to stop further components from falling along the track segment.

The output of latch 302 is extended to the input of one-shot multivibrator 305. As soon as the latch is set, the multivibrator extends a short pulse through OR gate 307 to the input of driver 308, which has a built-in time delay. The output of the driver goes high, and upper locator solenoid 142 is de-energized and upper locator 130 is released. At the same time, the output of the driver 308 causes motor relay 310 to become energized, which in turn causes the motor 82 to turn on. The built-in time delay of the driver 308 assures that solenoid 142 is de-energized and motor relay 310 energized after solenoid 120 is de-energized and solenoid 156 is de-energized With the motor on, the trays start to be shifted along the operative path.

The output pulse from one-shot multivibrator 305 is shorter in duration than the time required to move a tray by one track position. For this reason the motor cam microswitch 95 is provided. When the switch is closed, a high potential is extended to an input of OR gate 307. By the time the one-shot multivibrator pulse has terminated, the output of the motor cam switch has gone high and it is this signal which is now extended through OR gate 307 to the input of driver 308. It is only after the tray has been indexed one track position that the motor cam switch output goes low. At this time the output of driver 308 goes low, solenoid 142 is energized and motor relay 310 is de-energized.

The output or OR gate 307 is connected to the reset input of latch 302. At the trailing edge of the pulse at the output of OR gate 307, the latch is reset. With the latch in the reset state, solenoid 120 is energized once again and solenoid 156 is similarly energized. At this time, another track is filled with components. It should be noted that the latch is reset only at the trailing edge of the pulse output of OR gate 307. It is only after a complete indexing step that solenoid 120 should be energized and solenoid 156 should be energized.

The operation of the system for transporting electrical components will now be briefly summarized. A number of empty trays 10 are placed on the apparatus 44, and are situated with their lower edges in the lower rail 58. Such empty trays would be placed on the apparatus from the left hand side thereof, as seen in FIG. 1. The leading tray 10 is brought to a position in which its leading track, that is, the track furthest to the right as seen in FIG. 1, is in approximate alignment with the station S, with the center of the track being approximately centered on the the centerline E. With the power on and the latch 302 reset, the lower locator solenoid 120 is energized, casuing the lower locator 112 to rock and the head 122 of this locator to engage the track in alignment with the station S, this engagement taking place close to the lower end of the tray, again as seen in FIG. 1. At the same time, the component stop solenoid 156 is energized, causing the tongue 150 of the component-stop mechanism 148 to withdraw from the track segment 146, which leaves the track segment clear for components C to pass through station S. Again at the same time, the upper locator solenoid 142 is energized, causing the head 132 of the upper locator 130 to shift toward the tray, with said head centering the track in alignment with the centerline E of the station S. Simultaneously, the spring plunger 144 carried by said head opens the gate 28 associated with the track in alignment with the station S, whereupon components C sliding down the track segment 146 can fall freely into the track.

Components pass from a manufacturing operation through the station S and thus fill the track in alignment with said station. At this point, it should be noted that the bottommost component $C_1$ in the track cannot pass by head 122 of the lower locator 112, since the lip 126 of said head protrudes deeply into the track, preventing further movement of such lower component (see FIG. 10). When the track has been completely filled, components C back up into the track segment 146, and the existence of such components C in the segment for a predetermined period of time is detected by the sensing assembly 157. Upon such detection, appropriate signals as previously described cause the lower locator solenoid 120 to de-energize, so that the locator head 122 withdraws from the tray. This permits the lowermost component in the track and consequently all of the components above it, to fall from the level at which they were held by the head to the gate 28 at the lower end of the track. This clears the station S of any components in order that there by no interference during the forthcoming movement of the tray. The component stop solenoid 156 is de-energized at the same time that the lower locator solenoid is de-energized, so that the tongue 150 of the stop mechanism 148 extends into the groove 26' in the track segment 146, blocking further sliding of the components C downwardly through the station S. After the lower locator 122 has withdrawn from the tray and specifically from the track in alignment with the station S, the upper locator 130 also withdraws from the same track, this being caused by de-energizing the upper locator solenoid 142. At the same time, motor relay 310 is energized, so that the motor 82 starts through a cycle of operation. The drive assembly 60 thereupon causes the racks 68, 70 to swing through one circular path, and as the racks do so, they contact the backs of the trays, slide the trays to the right as seen in FIG. 1 to an extent the same as the width of a single track and then witdraw from the trays. The microswitch 95 opens upon engaging the flat 97 on the eccentric wheel 74a, so that the drive assembly will only operate the racks 68, 70 through one cycle. Next, the lower locator solenoid 120 is energized, causing the lower locator head 122 to again engage the now empty track which is now in alignment with station S. Then, the component stop solenoid 156 is energized, causing the tongue 150 to withdraw from the track segment 146 enabling components C to pass downwardly. At the same time, the upper locator 130 is caused to engage the track in alignment with the station S, this being caused by the energizing of upper locator solenoid 142. This also causes the track to be centered on the centerline E of station S, and causes the spring plunger 144 carried by the upper locator head to open the gate 28 so that component C may fall from the station S into the waiting track in alignment with said station. The process continues in the same manner, with track after successive track being filled with components.

As was previously mentioned, the apparatus 44 can also function as an unloader, so that components C can pass from the trays which are filled with such components, downwardly to the next manufacturing step. For this purpose, the upper locator 130 would be mounted on the lower rail 58, and when energized, would cause its plunger to open a gate 28 in alignment with the track engaged by the locator head, to enable components in such track to flow by the gate downwardly and out of the track. A track segment similar to track segment 146 would be located on the face plate 52 in alignment with the aforesaid lower locator. A sensing mechanism would determine when the track segment in alignment with the lower locator is empty, and thereupon would signal the next indexing of the trays.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

There is claimed:

1. A tray for temporarily containing electrical components, the tray being divided by ridges into a set of linearly elongated tracks in which the components can be stored and along which the components can slide and a set of track gates for selectively blocking the track, each gate being housed in a ridge and being adapted to shift between a first position blocking its associated track and a second position free from interference with said track, each of the set of tracks has an elongated groove formed therein for guiding the components stored therein, each gate in its first position having a portion thereof protruding into the groove of its associated track and in its second position being removed from said groove, each gate includes a member having a portion of enlarged dimension and a portion of reduced dimension, the gate in its first position having the first-named portion in alignment with the groove and the gate in its second position having the second-named portion in alignment with the groove, each member is a plunger having end portions of enlarged radius and a central portion of reduced radius, the plunger being situated in a bore in a ridge of the tray adjacent the track, the bore opening into the groove, one of the end portions of the plunger being in alignment with the groove in the first position of the gate and the central portion of the plunger being in alignment with the groove in the second position of the gate.

2. A tray as set forth in claim 1 including spring biasing means comprising a coil spring situated at the internal end of the bore below and abutting the plunger.

3. A tray as set forth in claim 2 wherein the bore opening is restricted to capture the plunger therein.

4. Apparatus for transporting trays for electrical components, each tray being divided into a set of tracks, along a linear path in an inclined plane, the apparatus including a rail for guiding the trays along the path, a station on the apparatus through which components slide including means to displace components into said trays, and drive means for periodically indexing the trays along the path and bringing one track after another into alignment with the station, the apparatus further including a drive member for urging the trays along the path, the drive means moving the member through a circular path to periodically intersect the inclined path, the drive member includes a set of gear teeth and the trays include a set of mating gear teeth, the teeth of the drive member contacting the teeth of the trays in the inclined path as the drive member moves through its circular path, the gear teeth of the drive member comprise a rack.

5. Apparatus for transporting trays as set forth in claim 4 wherein the drive means includes a pair of spaced wheels, means mounting the wheels for rotation about parallel axes, and means mounting the rack on the wheels eccentrically with respect to said axes.

6. Apparatus for transporting trays as set forth in claim 5 wherein the drive means includes two pairs of wheels, means for rotating each pair of wheels in common about parallel axes of rotation, a pair of shafts, and means mounting each shaft eccentrically with respect to one pair of wheels, the rack being journaled on both of such shafts.

7. Apparatus for transporting trays as set forth in claim 6 wherein the rack has a length greater than at least twice the width of a tray.

8. Apparatus for transporting trays for electrical components, each tray being divided into a set of tracks, along a linear path in an inclined plane, the apparatus including a rail for guiding the trays along the path, a station on the apparatus through which components slide including means to dispense components into said trays, and drive means for periodically indexing the trays along the path and bringing one track after another into alignment with the station, locator means for positioning each track of each tray successively in alignment with the station, the locator means includes a locating member having a head, and means mounting the member with respect to the path for movement between a first position in which the head is distant from a tray in the path in alignment with the station and a second position in which the head is contacting and centers the tray, the head is of wedge-shaped configuration to protrude into the track of a tray, the head of the member carries a lip, the lip, in the second position of the member, blocking sliding movement of electrical components along the track into which it protrudes.

9. An apparatus for transporting trays for electrical components, each tray being divided into a set of tracks, along a linear path in an inclined plane, the apparatus including a rail for guiding the trays along the path, a station on the apparatus through which components slide and drive means for periodically indexing the trays along the path and bringing one track after another into alignment with the station, the apparatus further including a drive member for urging the trays along the path, the drive means moving the member through a circular path to periodically intersect the inclined path, the drive member includes a set of gear teeth and the trays include a set of mating gear teeth, the teeth of the drive member contacting the teeth of the trays in the inclined path as the drive member moves through its circular path, the gear teeth of the drive member comprise a rack, further including a frameway opening to the inclined path, the rack in its circular path rotating in said frameway, and a cover plate engaged to the rack and reciprocating in said frameway in a direction intersecting the inclined path.

10. An apparatus for transporting trays as set forth in claim 9 wherein the apparatus further includes a backing plate fixed to the rack, the cover plate riding on said backing plate and reciprocating with respect thereto in a direction parallel to the inclined plane.

* * * * *